INVENTORS
ROBERT D. CAMPBELL
WILLIAM HUEBERT
BY R S Richardson
ATTORNEY.

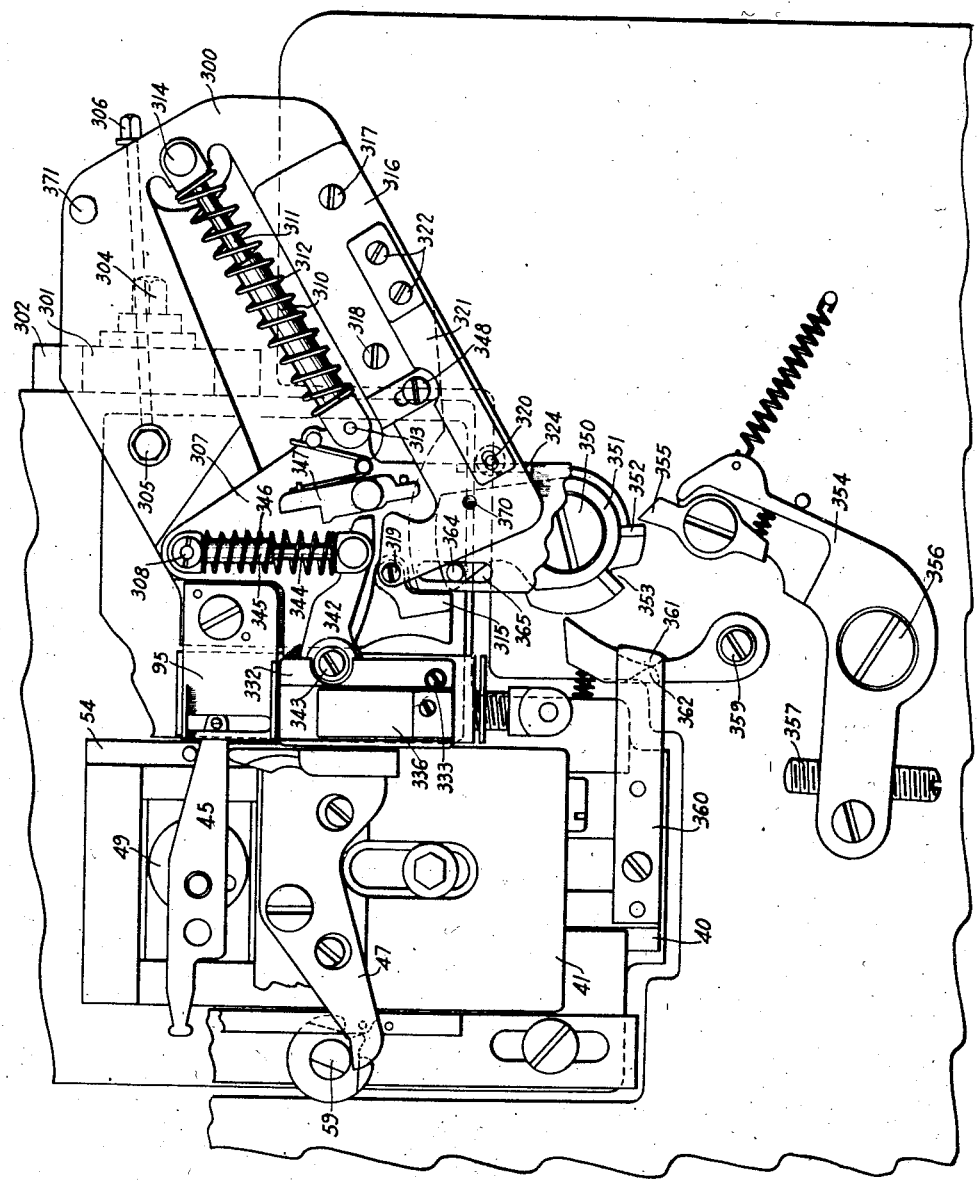

Nov. 30, 1937.   R. D. CAMPBELL ET AL   2,100,502
WELD TESTING DEVICE
Filed Feb. 24, 1936   4 Sheets-Sheet 3
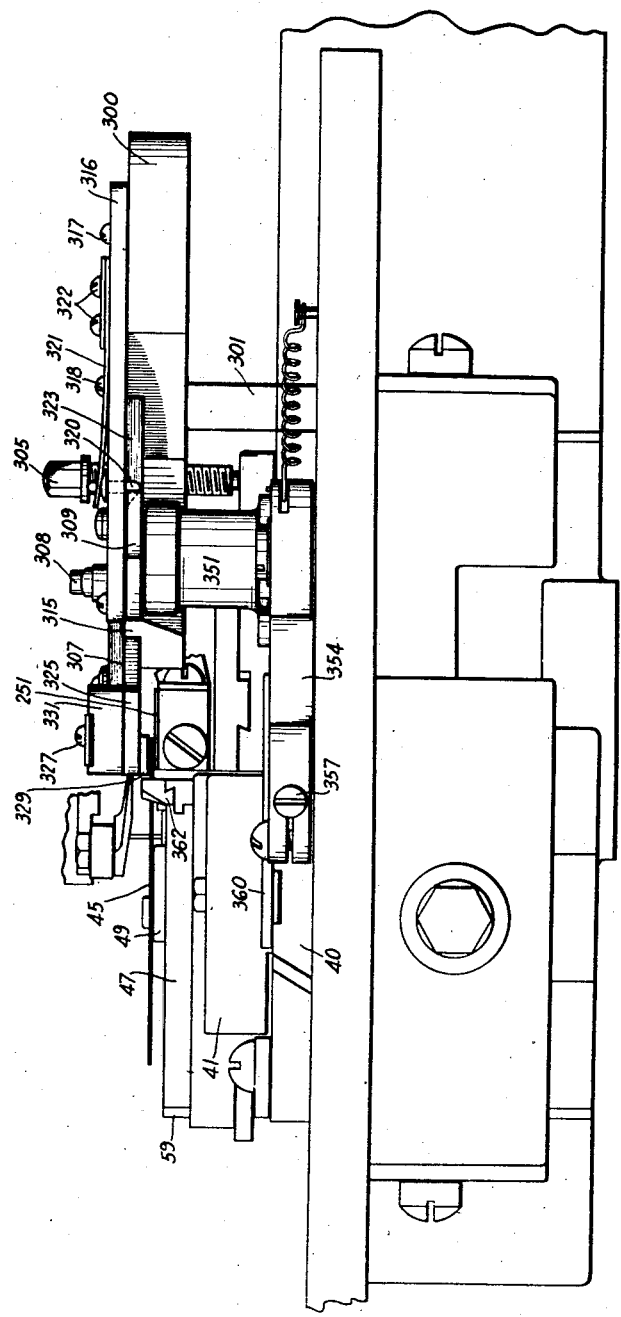
INVENTORS
ROBERT D. CAMPBELL
WILLIAM HUEBERT
BY
ATTORNEY.

Nov. 30, 1937.  R. D. CAMPBELL ET AL  2,100,502
WELD TESTING DEVICE
Filed Feb. 24, 1936   4 Sheets-Sheet 4
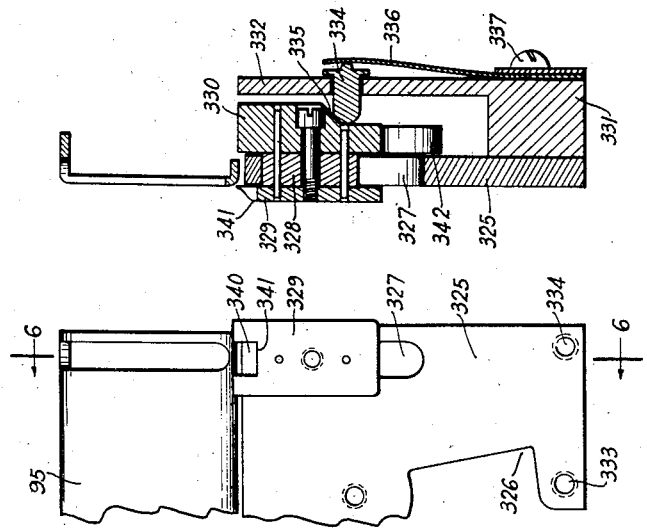
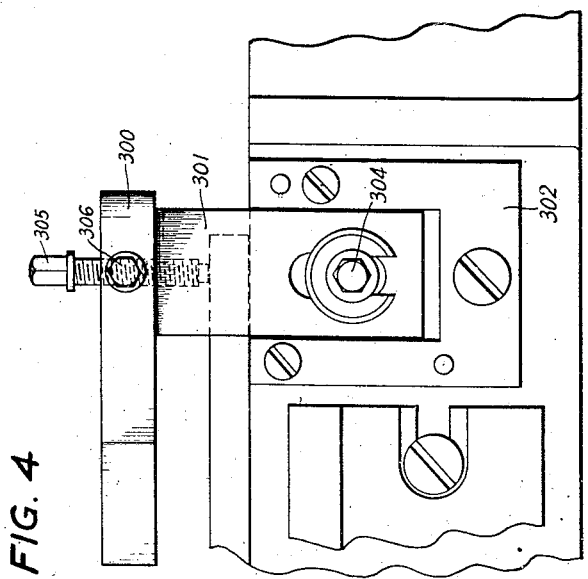
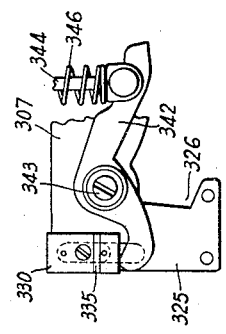
INVENTORS
ROBERT D. CAMPBELL
WILLIAM HUEBERT
BY
R G Richardson
ATTORNEY.

Patented Nov. 30, 1937

2,100,502

UNITED STATES PATENT OFFICE 2,100,502

WELD TESTING DEVICE

Robert D. Campbell, Chicago, and William Huebert, Glen Ellyn, Ill., assignors, by mesne assignments, to Associated Electric Laboratories, Inc., Chicago, Ill., a corporation of Delaware Application February 24, 1936, Serial No. 65,406

7 Claims. (Cl. 29—33)

The present invention relates in general to weld testing devices, and more in particular to a device of this character which is adapted to test the strength of the weld by means of which an electrical contact, usually of some noble metal or alloy thereof, is attached to a contact spring. The object of the invention, specifically, is an automatic weld testing device which constitutes an attachment for known contact welding machines.

The invention will be described more in detail hereinafter with reference to the accompanying drawings, comprising Figs. 1 to 7, inclusive, which show the weld testing device and as much of a contact welding machine to which it is attached as is necessary to explain its operation.

Referring to the drawings, Fig. 1 is a top view of the weld testing device in normal position, showing also certain parts of the contact welding machine which cooperate with it;

Fig. 2 is a similar top view, except that the weld testing device is shown in testing position;

Fig. 3 is a front view of the parts shown in Fig. 2;

Figure 1:
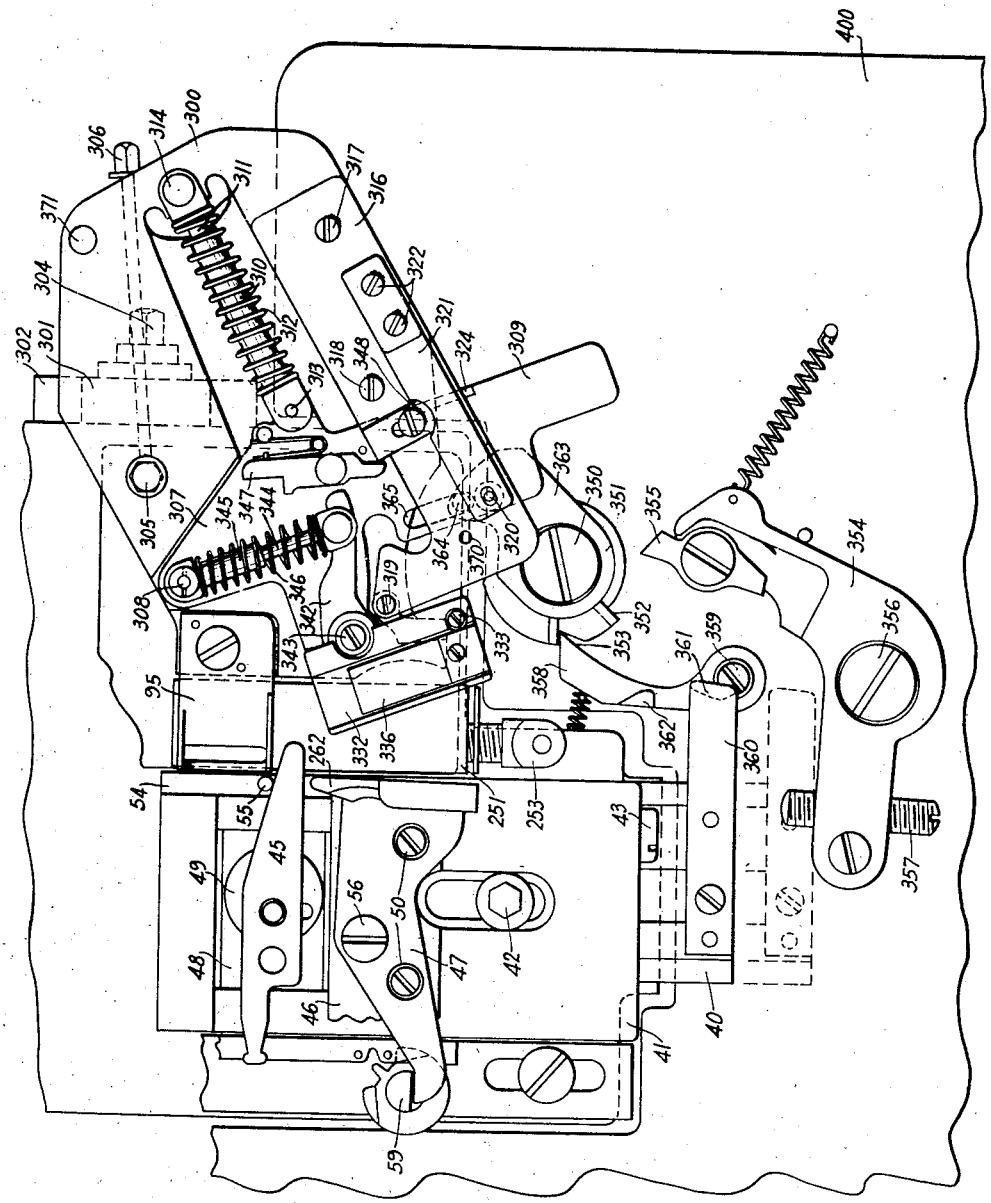

Fig. 4 is a detail drawing showing how the weld testing device is attached to the welding machine; while Figs. 5, 6, and 7 show the construction of the parts which are directly involved in the testing operation.

The contact welding machine in connection with which the weld testing device is illustrated is of the general type disclosed in the patent to Hosford, No. 1,090,619, being, however, of the particular type shown in the patent to Doyle, No. 1,794,760. Certain parts of the welding machine which cooperate with the weld testing device or which are necessary for an explanation of it are shown in the drawings and bear the same reference numerals as in the Doyle patent. These parts will be referred to in explaining the operation but in view of the Doyle disclosure it will not be necessary to describe them herein.

The various parts of the weld testing device are mounted on a base plate 300. A member 301 is secured to the lower side of the base 300 and provides for securing it to the frame of the welding machine. In explanation of this it may be stated that the Doyle machine is provided with a stop plate 95, serving also as a gauge, which is attached to the frame by means of which it is secured to the frame. This bracket has a downwardly extending portion corresponding in dimensions to member 301, and fitting against the frame, see Fig. 4, between the guides formed by the two legs of U-shaped member 302, where it is firmly secured by the screw 304. In order to attach the weld testing device the bracket referred to is removed and the weld testing device is substituted for it. Fig. 4 shows the weld testing device in place. It will be observed that the member 301 is slotted, to enable the base 300 to be raised or lowered so as to adjust the testing device to an exact position with respect to the welding machine. To facilitate this adjustment there is a screw 305 threaded in the base 300 and bearing on a part of the frame. The adjustment is carried out by loosening screw 304 and by turning the screw 305 in the proper direction to raise or lower the base 300 as desired. When the base is in the proper position the screw 304 is tightened up to hold it there. A screw 306 is provided for locking the adjusting screw 305.

The stop member 95 is a necessary part of the welding machine and must be replaced, so it is attached to the base 300 as shown in Figs. 1 and 2. As a matter of fact, this part 95 is changed somewhat, being made shorter so as to avoid interfering with parts of the weld testing device.

The base 300 is recessed or cut away on top and within this recess is mounted a swinging member 307, pivoted at 308. This member 307 carries most of the parts of the testing device, and has an extension or handle 309 by means of which it can be moved by hand if occasion requires. To the member 307 there is attached by means of pivot 313 a tubular member 310, within which there is slidably mounted a rod 311, the latter being pivoted on the base 300 at 314. The base 300 is recessed sufficiently to receive these parts. There is a spring 312 surrounding the tubular member 310 and rod 311, as shown clearly in Figs. 1 and 2. This spring urges the swinging member to turn on its pivot 308 in a clockwise direction. In Fig. 1 the member 307 is locked in the position shown by means which will be described, the spring 312 being under compression; and in Fig. 2 the member 307 has been unlocked or released and the spring 312 has rotated it on its pivot to the position shown. In this position the handle 309 engages the shoulder 315 on base 300.

Partly to form a guide for the swinging member 307 there is provided a plate 316 which rests on the upper surface of base 300 and on the shoulder 315, the latter being in fact a portion left when the upper surface of the base is recessed, and is held in place by screws 317, 318, and 319. Plate 316 therefore extends over the upper surface of member 307, or rather the extension handle thereof 309, and with the recessed portion of the base forms a slot 323, Fig. 3, in which the handle 309 is movable. Plate 316 has a hole in which is positioned a locking pin 320. This pin is urged downward by spring 321, the latter being fastened to plate 316 by screws 322, and its lower end lies in the path of the handle 309. The right-hand edge of this extension handle 309 is cut away at an angle at 324, so that when the member 307 is rotated on its pivot 308 in a counter-clockwise direction from the position shown in Fig. 2 the pin 320 can ride up on the upper surface of extension handle 309.

The member 307 has a rectangular extension 325 at the left, the shape of which can be seen clearly in Fig. 7, also in Fig. 5, which is a view from the lower side. The extension 325 is cut away at 326 so as to provide space for the shoulder 315 when member 307 is in the position in which it is shown in Fig. 1.

The parts for engaging the welded contact and testing it are mounted on extension 325 and are shown in detail in Figs. 5, 6, and 7. There is a slot 327 cut in extension 325 and in this slot lies a block 328. On the lower side of 325 is a plate member 329 and on the upper side there is a block 330. These three parts are securely held together by pins and a countersunk screw as shown clearly in the cross section, Fig. 6. The assembly is slidable in slot 327. A member 331, having a plate extension 332, is secured to extension 325 by means of two countersunk screws 333 and 334, Fig. 5. The former screw can be seen in Figs. 1 and 2. The plate extension 332 has a slot cut through it in which is inserted a wedge 334. This wedge has a rounded end which engages the cam surface 335 of block 330. The wedge is pressed into engagement with the block by a spring 336 which is secured to member 331 by means of a screw 337. It will be seen that sliding of the 328—330 assembly in the slot 327 is opposed by the wedge 334. The amount of opposition afforded can be adjusted by regulating the tension of spring 336.

Referring to Fig. 3 it can be seen that the weld testing device is so positioned that the lower surface of plate member 329 is just a short distance above the electrode 251 of the welding machine, there being just sufficient space to allow for the passage of a contact spring edgewise between them. The plate member 329 is cut away at 340, in line with the travel of a contact, so as to present a square edge 341 adapted to be engaged by the contact. This will be explained in detail in discussing the operation.

There is a lever 342 pivoted on member 307 at 343. One end of this lever is adapted to be engaged by block 330 when the assembly 328—330 slides in slot 327. At the other end of lever 342 there is pivotally secured a rod 344, which slides in a tubular member 345, the latter being pivoted at 308. The same pivot 308 serves for 307 and also for 345. A coil spring 346 is provided to urge the lever 342 to rotate on its pivot in a clockwise direction, maintaining the assembly 328—330 in the position shown in Fig. 6.

Also mounted on member 307 is a pivoted dog 347. When the assembly 328—330 slides in the slot 327, as will be subsequently explained, the lever 342 is rotated and the end of the lever engages dog 347 which holds the lever in rotated position. The dog is adapted to be released by engagement with a fixed trip member 348 secured to plate 316, as can be seen clearly in Fig. 1.

The parts for controlling the automatic movement of swinging member 307 are all mounted on the horizontal plate or table 400 with which the welding machine is provided. This part can be readily identified in the Doyle patent, although it bears no reference numeral. On a stud 350 there is rotatably mounted a barrel-shaped member 351. This member is adapted to be rotated by a dog 355 engaging the projection 352. The dog 355 is mounted on a lever 354 which is pivoted at 356. The end of the lever carries a screw 357, the end of which is engaged by the carriage 40 of the welding machine, as will be described hereinafter. The member 351 is shown in rotated position in Fig. 1. It is held in this position by means of a dog 358 the end of which engages the notch 353 in 351. The dog 358 is adapted to be tripped or released by a member 360 attached to the carriage 40. This member 360 has a cam on its lower side, shown in dotted lines in Figs. 1 and 2, which engages the projection 362 on dog 358 during the rearward movement of the carriage. At the upper end of member 351 there is an extension 363 which lies just underneath the extension handle 309 of member 307. The base 300 is recessed as shown in dotted lines in Figs. 1 and 2 to allow room for 363. Extending upward from extension 363 there is a pin or stud 364 which lies in a slot 365 in the extension handle 309. It can be seen that when member 351 is rotated from the position in which it is shown in Fig. 2 to the position in which it is shown in Fig. 1, the pin 364 will cause the member 307 to swing on its pivot.

If it is desired to stop the use of the automatic testing device for any reason a pin 371 may be inserted in the hole 370 in plate 316. This pin 371 is conveniently kept in a hole in the base 300 when not in use, as shown in the drawings. When the pin is inserted in hole 370, see Fig. 1, it lies in the path of extension handle 309 and prevents the swinging member 307 from moving to the testing position, Fig. 2, when the dog 358 is tripped by the member 360 on carriage 40.

The operation of the weld testing device will now be described. In its normal position the carriage 40 is somewhat further forward than it appears in Fig. 1. The limit of the forward movement is indicated by the dotted outline of the end of the carriage and member 360. When the carriage is in this position the machine is at rest. The operator places the spring 45 on supports 49 and 54 as shown in Fig. 1 and then depresses the foot treadle which starts the machine. The carriage now moves to the rear to welding position, the end of spring 45 passing underneath the stop plate 95. As the carriage passes the point in which it is shown in Fig. 1, the cam 59 rotates lever 47 slightly and the finger 262 is thereby moved over against the edge of spring 45. The spring is held between pin 55 and finger 262 without appreciable play but not so tightly but what it can move up and down.

In welding position spring 45 is just about midway underneath the stop plate 95. The carriage 40 stops here for a brief interval while the welding operation takes place. This is all described in the Doyle patent, but for convenience it may be stated here that the machine includes a chuck which feeds a wire (made of contact metal) down vertically through the slot in stop plate 95 and against the spring 45, which is pressed down against the electrode 251; the upper surface of which is level with the surface of support 54. The welding current is now turned on momentarily and the end of the wire is welded to the spring. Following the welding operation the chuck moves upward, lifting the spring 45 by means of the attached wire, until the spring engages the lower surface of stop plate 95, after which the wire slips in the chuck while it completes its upward movement. A pair of cutting knives or shears are now operated and the wire is severed at the upper surface of stop plate 95, leaving a short piece attached to spring 45, which drops down on support 54 again.

The carriage 40 now moves further to the rear, to contact forming position. Fig. 2 shows the carriage shortly after it has left welding position. Just as the carriage leaves the welding position the cam 361 on the under side of member 360 engages the projection 362 on dog 358 and moves the dog out of notch 353 in member 351. This releases member 351 and the swinging member 307 and these parts move rapidly to the position in which they are shown in Fig. 2, under the power of spring 312. The pin 320 drops in place behind the extension handle 309, as seen clearly in Fig. 3. It will be observed that the weld testing assembly now lies just in front of stop plate 95, with the plate member 329 squarely in the path of the welded contact.

The carriage 40 pauses an instant in contact forming position, with the end of spring 45 resting on an anvil (not shown) while a die (also not shown) is brought down on the attached piece of wire to form it into a contact of the desired shape. The die is immediately lifted and the carriage 40 moves forward to normal position without further pause, passing rapidly through the positions in which it is shown in Figs. 2 and 1 to the extreme forward position indicated by the dotted lines in Fig. 1.

During the forward movement of the carriage the spring 45 passes between the electrode 251 and the plate member 329, and the contact welded to the upper surface of the spring engages the square edge 341 of the latter member. Assuming now that the contact is welded to the spring satisfactorily, the further forward movement of the carriage carrying the spring 45 with it will cause the assembly 328—330 to slide in slot 327, operating the lever 342. The test is performed at the beginning of the movement of the assembly 328—330, when the wedge 334 is forced to ride up the cam surface 335 on block 330. The spring 336 may be adjusted so that a force of about eight pounds is required to effect this movement. While the test is being performed the pressure exerted by the contact on the plate member 329 tends to rotate the swinging member 307 on its pivot, but such movement is prevented by the spring 312 and by the pin 320.

The movement of assembly 328—330 operates lever 342 against the tension of spring 346. Before block 328 reaches the end of slot 327 the end of lever 342 becomes locked on dog 347. An instant later the carriage 40 engages the end of screws 357 and begins to operate lever 354. During the remainder of the forward movement of the carriage the lever 354 rotates the member 351 and the latter rapidly swings the testing assembly out of the way of the contact. Pin 320 offers considerable resistance at the start but due to the sloping surface 324 it is compelled to rise against the tension of spring 321 and permits the handle 309 to pass beneath it. The parts assume the position in which they are shown in Fig. 1, with the member 351 locked by dog 358.

Just before this position is reached the forward end of dog 347 engages member 348, with the result that the dog is rotated on its pivot enough to release lever 342. Spring 346 returns the assembly 328—330 to the position in which it appears in Figs. 5 and 6, where it is ready for another test.

The operator now removes the completed contact spring and puts another spring in its place, after which the starting treadle is again operated. The welding machine and the testing device accordingly repeat the operations just described, welding and forming a contact on the spring and testing the weld as the carriage moves forward to normal position. Assuming in this case that the weld is defective, the contact will break off when it engages the member 329, and the parts of the testing device which move when the weld is good are not operated. This, of course, makes no difference as regards the position these parts finally assume when the carriage reaches normal position. When the operator removes the spring from the carriage she observes that the contact has been broken off and suspends operations until the reason for the defective weld can be determined and the necessary repairs or adjustments are performed.

The invention having been described that which is considered to be new and for which the protection of Letters Patent is desired will be pointed out in the appended claims.

What is claimed is:

1. The combination, with a machine for welding contacts on springs or other metallic members as they are fed successively through the machine, of a weld testing device adapted to be attached to said machine, and means included in said testing device for momentarily interposing a predetermined resistance to the normal movement of each spring through the machine, said resistance being applied through the contact, thereby automatically testing the strength of each weld after it is completed and before the next weld is made.

2. The combination, with a machine for welding contacts on springs or other metallic members as they are fed successively through the machine, of a weld testing device attached to said machine, and means included in said testing device for automatically applying a blocking force to each contact while the associated spring is moving and in a direction opposite to the direction of spring movement, thereby breaking off every contact which is not satisfactorily welded.

3. The combination, with a machine for welding contacts on springs or other metallic members as they are fed successively through the machine, of a weld testing device attached to said machine, and means included in said device for applying a predetermined force to each welded contact in the proper direction to oppose movement of the spring to which the contact is welded, whereby the movement of the spring will break the contact off if the weld is defective.

4. The combination in a machine for testing a joint between two parts, of means for moving the parts, moving spring and of a member interposed in the path of one of said parts, and means for causing said member to resist being moved when engaged by said part, thereby testing the strength of the joint.

5. The combination, with a contact welding machine which includes a carriage movable backward and forward together with means for welding and forming a contact on a spring while the carriage pauses in its backward movement, of a weld testing device, said device including a movable member interposed in the path of the welded contact and engaged thereby in the forward movement of said carriage, and means for causing said member to resist movement of the welded contact, whereby if the weld is defective the welded contact will be broken off.

6. In combination, a welding machine having a reciprocating carriage for carrying a contact spring to contact welding and forming positions and for returning the same to the starting position, a weld testing device, means effective prior to contact formation for moving said testing means into the path which the contact follows on the return movement of the carriage, whereby the weld is tested by engagement between said contact and the testing means on the return movement of the carriage, and means effective after the test is completed for moving said testing means out of the path of said contact before the carriage fully returns to starting position.

7. In a weld testing device, a movable member adapted to be engaged and moved by a moving contact, a spring opposing movement of said member, means for locking said member in the position to which it is moved by said moving contact, means for moving said member out of the path of said contact while remaining locked, and means for releasing said member after it has been moved out of the said path.

ROBERT D. CAMPBELL.
WILLIAM HUEBERT.